United States Patent
Mori et al.

(10) Patent No.: US 6,567,183 B1
(45) Date of Patent: May 20, 2003

(54) OUTPUT APPARATUS AND OUTPUT METHOD

(75) Inventors: Junichi Mori, Kawasaki (JP); Toshihiko Ikeno, Yokohama (JP); Yoshiyuki Kojo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/507,939

(22) Filed: Feb. 22, 2000

Related U.S. Application Data

(62) Division of application No. 08/357,330, filed on Dec. 16, 1994, now Pat. No. 6,052,204.

(30) Foreign Application Priority Data

Dec. 17, 1993 (JP) .............................................. 5-318741

(51) Int. Cl.$^7$ .............................................. G06F 15/00
(52) U.S. Cl. ..................... 358/1.15; 358/3.28; 358/400; 358/1.17; 358/1.1
(58) Field of Search ............................. 358/3.28, 1.15, 358/400, 1.17, 1.1

(56) References Cited

U.S. PATENT DOCUMENTS

| | | | |
|---|---|---|---|
| 4,991,972 A | | 2/1991 | Ikenoue et al. ............. 395/113 |
| 5,440,409 A | * | 8/1995 | Sugano et al. .............. 358/501 |
| 5,706,412 A | | 1/1998 | Kojo .......................... 395/115 |

FOREIGN PATENT DOCUMENTS

| | | |
|---|---|---|
| EP | 0556994 | 8/1993 |
| EP | 0595594 | 5/1994 |
| JP | 5-250108 | 9/1993 |
| WO | WO 9012359 | 10/1990 |

OTHER PUBLICATIONS

IBM Tech. Discl. Bull., vol. 30, No. 5, Oct. 5, 1987, pp. 242–248, "Enhanced Print Queue Management Program".

* cited by examiner

Primary Examiner—Edward Coles
Assistant Examiner—Ashanti Ghee
(74) Attorney, Agent, or Firm—Fitzpatrick, Cella, Harper & Scinto

(57) ABSTRACT

An output apparatus comprises: a plurality of interface sections for inputting data which is supplied from an upper apparatus such as a host computer; an input buffer section to store the input data; an analyzing section for analyzing the input data and for forming predetermined image data; and an output section such as a laser beam printer or the like for outputting or printing the image data. The output apparatus further includes a judging section for judging whether the data inputted from which one of the plurality of interface sections should be deleted, a deleting section for deleting by a predetermined method the data of the input buffer section in which the data to be deleted has been stored, and a notifying section to notify the interface which is deleting at present to the operator. When the designated interface section differs from the interface section which is printing at present, it is judged that the data in the input buffer section should be deleted. When the designated interface section coincides with the interface section which is printing at present, the data in both of the input buffer section and the data storing section to store the image data is deleted.

6 Claims, 4 Drawing Sheets

OUTPUT APPARATUS AND OUTPUT METHOD

This application is a division of application Ser. No. 08/357,330, filed on Dec. 16, 1994 now U.S. Pat. No. 6,052,204.

BACKGROUND OF THE INVENTION

1 Field of the Invention

The present invention relates to an output apparatus and, more particularly, to an output apparatus in which a plurality of interface sections to input data which is given from an upper apparatus are installed and to its output method.

2. Related Background Art

Among conventional output apparatuses, for example, among printing apparatuses such as printer and the like, there is an apparatus in which a plurality of interface sections to input data are installed and each interface section can be connected to a host computer, a network, and the like through each predetermined cord. In case of such a printing apparatus, it can be used by a method such that, for example, a certain interface is connected to a personal computer and the other interfaces are connected to a workstation through a network, or the like. Therefore, each time a printing process is executed from the personal computer or workstation, a complicated operation such that the cords are physically connected again is unnecessary.

On the other hand, there is a case where, for instance, after the operator sent data to the printing apparatus, he desires to stop the printing process for the supplied data in the halfway before the process of the printing apparatus is finished. Or, in the case where, for instance, the printing apparatus cannot perform a normal print and the process is interrupted because illegal data was inputted, there is a case where it is necessary to delete the illegal data which has already been stored in the printing apparatus. As a countermeasure for such cases, many printing apparatuses have a function for deleting all of data stored in the printing apparatus and forcedly stopping the process by instructing the resetting from an operation panel or the like of a main body by the operator. Such a function to forcedly stop the process is, for example, called a resetting function.

In the case where the printing apparatuses are connected to a plurality of host computers through a plurality of interface sections as mentioned above or the like, however, when the above resetting function is executed, the data inputted from all of the host computers is forcedly deleted. That is, in the case where, when a certain operator has sent illegal data from a certain host computer through a certain interface section and has executed the resetting process because he must stop the printing process in the halfway, there is a problem such that the data inputted from another host computer through another interface by another operator is also deleted at the same time, so that another operator is annoyed by a certain operator or the like.

SUMMARY OF THE INVENTION

The present invention is made to solve the above problem and it is an object of the invention to provide output apparatus and output method in which data in a buffer corresponding to an interface which was arbitrarily designated is deleted.

To solve the above problems, according to the invention, there is provided an output apparatus comprising: a plurality of interface sections for inputting data which is supplied from an upper apparatus; an input buffer section for storing the input data; an analyzing section for analyzing the input data and for forming predetermined image data; and an output section for outputting the image data, wherein the apparatus further includes judging means for judging whether the data inputted from which one of the plurality of interface sections should be deleted and deleting means for deleting by a predetermined method the data in the input buffer section in which the data to be deleted has been stored.

To solve the above problems, according to the present invention, there is provided an output apparatus comprising: a plurality of interface sections for inputting data which is supplied from an upper apparatus; an analyzing section for analyzing the input data and for forming predetermined image data; a data storing section for storing the image data; and an output section for outputting the image data, wherein the apparatus further includes judging means for judging whether the image data for the data inputted from which one of the plurality of interface sections should be deleted and deleting means for deleting by a predetermined method the data in the data storing section in which the image data to be deleted has been stored.

BRIEF DESCRIPTION OF THE PREFERRED EMBODIMENT

Before explaining a construction of an embodiment, preferred constructions of a laser beam printer and an ink jet printer to which the embodiment is applied will now be described with reference to FIGS. 1 and 2.

A printer to which the embodiment is applied is not limited to the laser beam printer and ink jet printer but printers of other printing systems can be also used.

Figure 1:
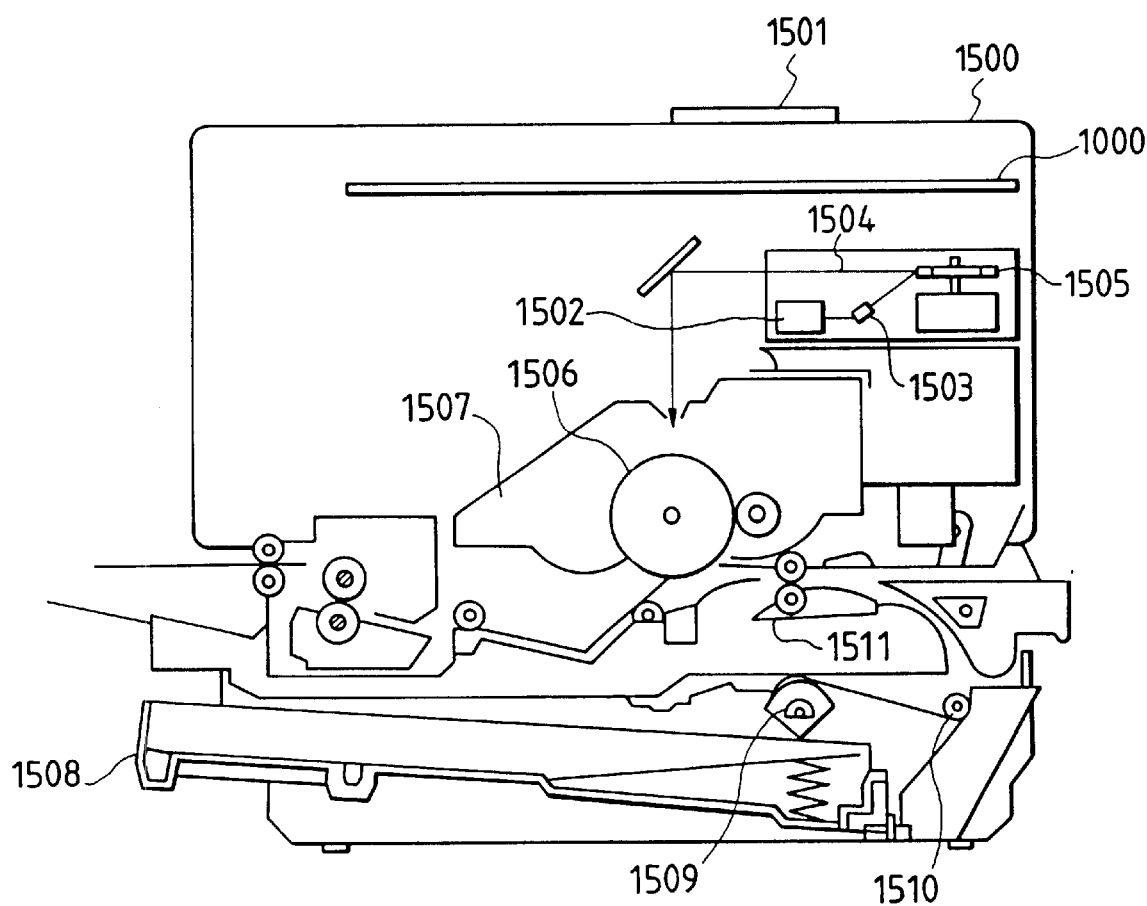
FIG. 1 is a cross sectional view of a first output apparatus to which the present invention can be applied.

FIG. 1 is a cross sectional view showing a construction of a first output apparatus to which the invention can be applied and shows a case of, for example, a laser beam printer (LBP).

In the diagram, reference numeral 1500 denotes an LBP main body for receiving and storing print information (character code or the like), form information, macro command, and the like which are supplied from a host computer connected to the outside, for forming a corresponding character pattern, form pattern, or the like in accordance with those information, and thereby for forming an image onto a recording paper or the like as a recording medium.

Reference numeral 1501 denotes an operation unit on which switches, an LED display device, and the like for the operation are arranged. Reference numeral 1000 indicates a printer control unit to control the whole LBP main body 1500 and to analyze character information and the like which are supplied from the host computer. The printer control unit 1000 mainly converts the character information to the video signal of the corresponding character pattern and outputs to a laser driver 1502. The laser driver 1502 is a circuit to drive a semiconductor laser 1503. The laser driver 1502 switches the on/off operations of a laser beam 1504 which is emitted from the semiconductor laser 1503 to be turned on or off in accordance with the input video signal. The laser beam 1504 is swung to the right and left by a rotary polygon mirror 1505, thereby scanning and exposing onto an electrostatic drum 1506.

Due to this, an electrostatic latent image of the character pattern is formed on the electrostatic drum 1506. The latent image is developed by a development unit 1507 arranged around the electrostatic drum 1506 and, after that, the developed image is copy transferred onto the recording paper. A cut sheet is used as a recording paper. The cut sheet recording papers are enclosed on a sheet cassette 1508 set in the LBP main body 1500 and are picked up and conveyed one by one into the apparatus by a paper feed roller 1509 and conveying rollers 1510 and 1511, and the paper is supplied to the electrostatic drum 1506.

The LBP main body 1500 has at least one or more card slots (not shown), thereby enabling an optional font card and a control card (emulation card) of a different language system to be connected in addition to the built-in font.

The LBP main body 1500 further has a hard disc, so that the main body 1500 can store font data or can down-load the contents of the foregoing optional font card and a control card (emulation card) of a different language system.

Figure 2:
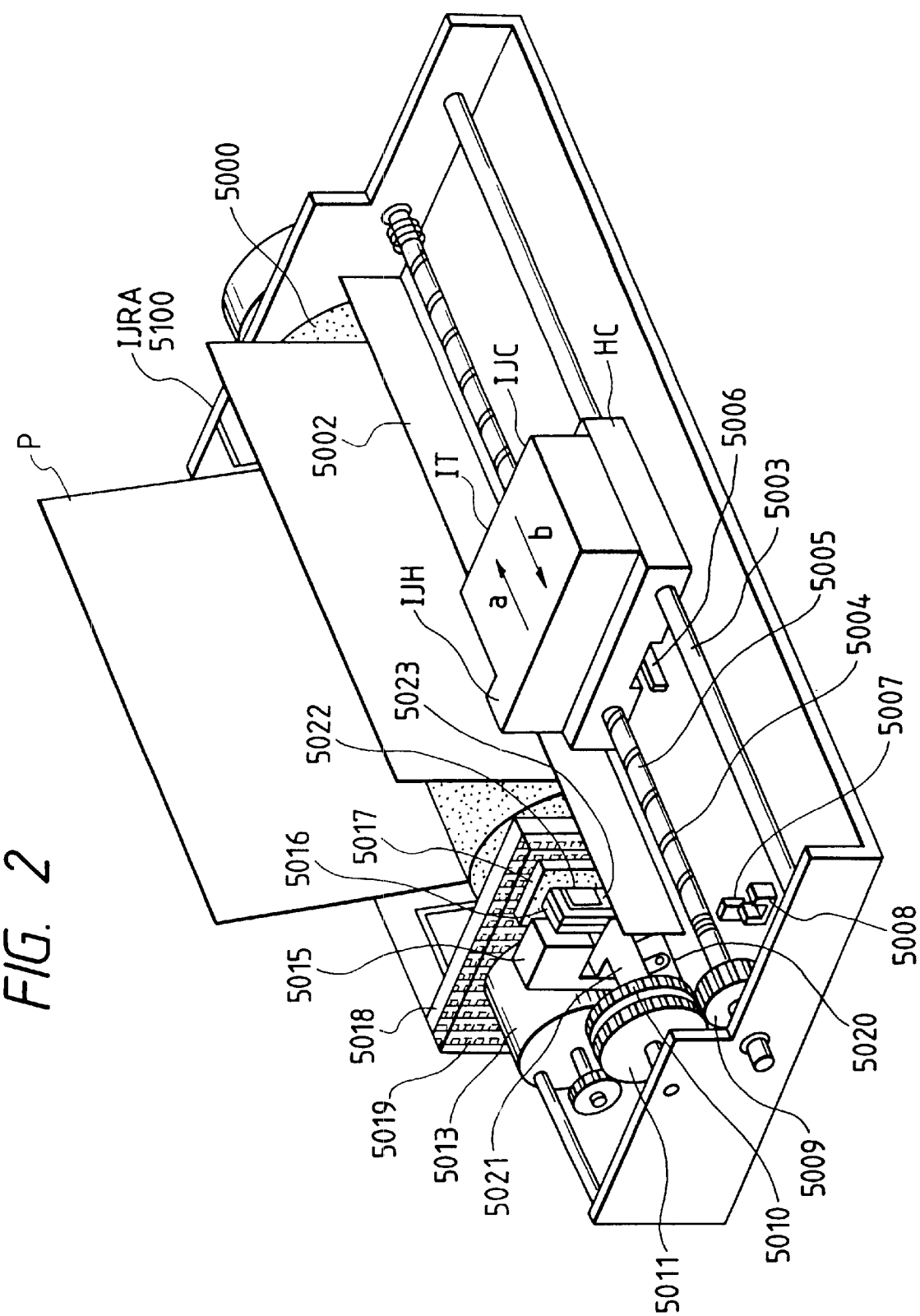
FIG. 2 is an external view of a second output apparatus to which the invention can be applied.

FIG. 2 is an external view showing a construction of a second output apparatus to which the invention can be applied and shows a case of, for example, an ink jet recording apparatus (IJRA5100).

In the diagram, a carriage HC which is come into engagement with a spiral groove 5004 of a lead screw 5005 which rotates in an interlocking relation with forward/reverse rotation of a drive motor 5013 through driving force transfer gears 5011 and 5009 has a pin (not shown) and is reciprocated in directions of arrows (a) and (b). An ink jet cartridge IJC is mounted on the carriage HC. Reference numeral 5002 denotes a paper pressing plate which presses the paper to a platen 5000 in the moving direction of the carriage; 5007 and 5008 photocouplers which function as home position detecting means for recognizing the existence of a lever 5006 of the carriage in the area of the photocoupler and for performing the switching operation of the rotating direction of the motor 5013 or the like; 5016 a member to support a cap member 5022 for capping the whole surface of the recording head; 5015 sucking means for sucking the inside of the cap and for performing the sucking recovery of the recording head through an opening 5023 in the cap; 5017 a cleaning blade which can be moved in the front and rear directions by a member 5019; 5018 a main body supporting plate which supports the blade 5017 and member 5019; and 5012 a lever to start the sucking operation of the sucking recovery. The lever moves in association with the movement of a cam 5020 which is come into engagement with the carriage and a driving force from the driving motor is transferred and controlled by well-known transmitting means such as a clutch switching or the like.

Although those capping, cleaning, and sucking recovery are constructed in a manner such that a desired process can be performed by the operation of the lead screw 5005 at its corresponding position when the carriage reaches a region on the home position side, it is sufficient to construct so as to perform a desired operation at a well-known timing.

The IJRA main body 5100 has at least one or more card slots (not shown) so as to connect an optional font card and a control card (emulation card) of a different language system in addition to a built-in font.

The IJRA main body 5100 further has a hard disc and can also store font data and down-load the contents of the optional font card and control card (emulation card) of the different language system as mentioned above.

Figure 3:
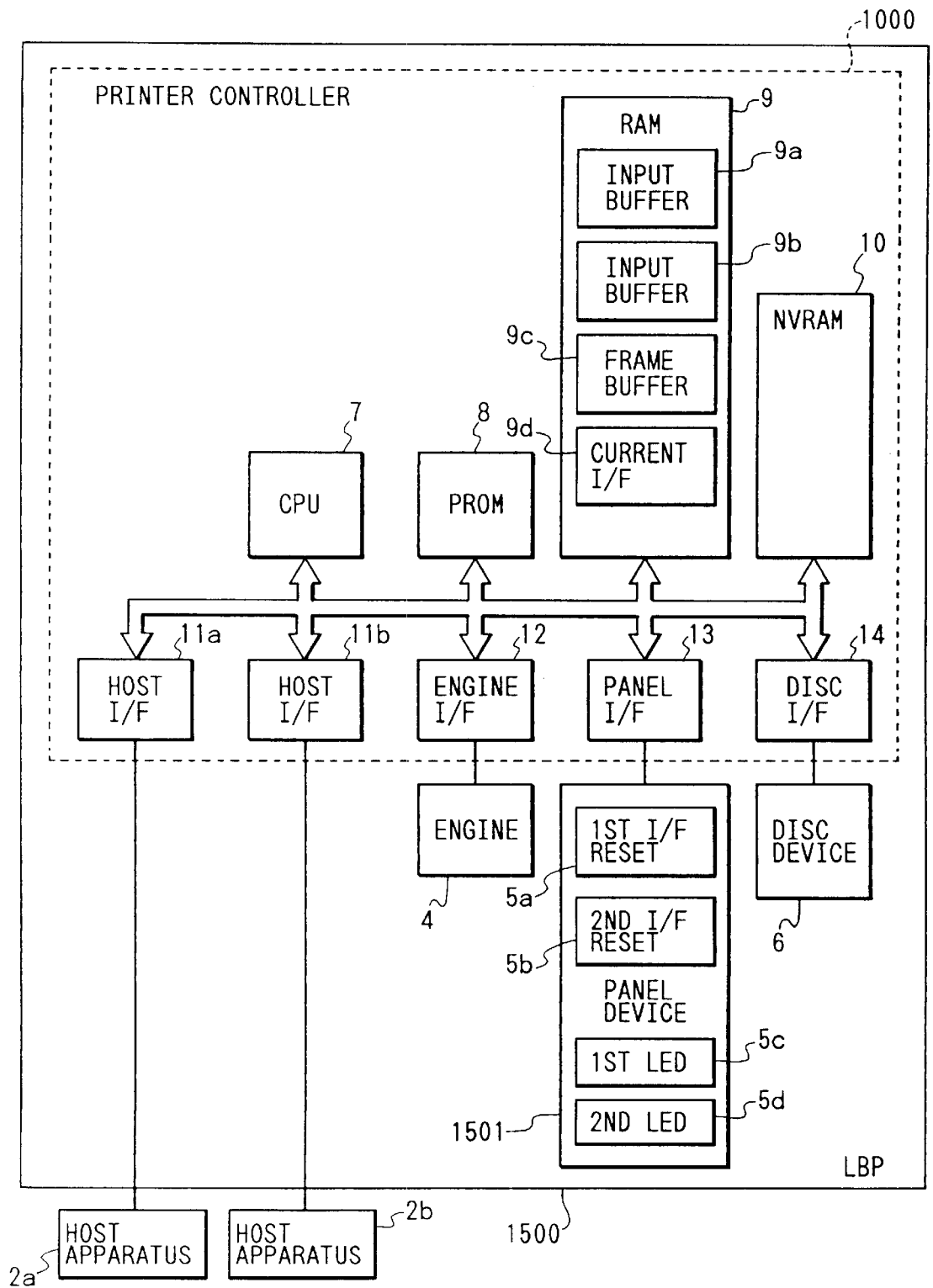
FIG. 3 is a system block diagram of the output apparatus in FIG. 1.

FIG. 3 is a system block diagram showing a construction of a printing apparatus according to an embodiment of the present invention and shows the laser beam printer shown in FIG. 1 as an example.

In FIG. 3, reference numeral 1500 denotes the laser beam printer (hereinafter, referred to as an "LBP") comprising the printer controller 1000 (hereinlater, referred to as a controller), an engine 4, the panel device 1501, and a disc device 6. The LBP 1500 is connected to external host apparatuses 2a and 2b. The LBP is constructed in a manner such that it receives the print data or the like from the host apparatuses 2a and 2b, and executes a printing process.

In the controller 1000, a CPU 7 controls each section on the basis of various kinds of control programs stored in a PROM 8. In the PROM 8, the following programs have also been stored: a print data analyzing program which is referred by the CPU 7 when the input data such as print data or the like is interpreted and converted into the image data; a first deleting program for deleting the data stored in an input buffer section by a predetermined method; a second deleting program for deleting the data stored in a frame buffer section by a predetermined method; a judging program for comparing the designated interface section and the interface section which is executing the printing process at present and for judging either one of the first and second deleting programs which is used; and the like.

A first host interface (hereinbelow, the interface is referred to as an "I/F") 11a and a second host I/F 11b are the interfaces for communicating the print data, command, and the like with the host apparatuses 2a and 2b, respectively. An engine I/F 12 communicates with the engine 4 which actually prints. A panel I/F 13 is an interface for communicating an instruction and a state with the panel device 1501 for indicating a state of the LBP 1500 to the operator and for instructing to change a printing environment or to designate the I/F to be reset for the LBP 1500 by the operator. A disc I/F 14 communicates with the disc device 6.

Reference numeral 9 denotes an RAM having: a first input buffer 9a to temporarily store the input data such as print data or the like from the host 2a; a second input buffer 9a to temporarily store input data such as print data or the like from the host 2b; a frame buffer 9c to store the image data; and a current I/F name storage area to store the name of I/F which is executing the printing process at present. The RAM 9 is also used as a work area of the CPU 7.

Reference numeral 10 denotes an NVRAM (non-volatile memory) in which an area to store information such as a printing environment or the like is held.

The panel device 1501 comprises; a first I/F reset button 5a which is depressed in the case where the operator desires a resetting process of the input data from the first I/F 11a; a second I/F reset button 5b which is depressed in the case where the operator desires the resetting process of the input data from the second I/F 11b; a first LED 5c which is turned on during the resetting process of the data from the first I/F 11a; a second LED 5d which is turned on during the resetting process of the data from the second I/F 11b; a liquid crystal panel (not shown) to display a character train (for instance, the name of the I/F which is being reset); and the like.

The disc drive 6 is an external storage apparatus to store various kinds of data, such as hard disc drive, magnetooptic disc drive, floppy disc drive, or the like.

The engine 4 is an apparatus to actually print the image data to the recording medium.

The LBP 1500 receives an electric power from a power source section (not shown).

An ordinary printing process which is executed by the LBP 1500 in the case where data is supplied from the host 2*a* will now be described with reference to FIG. 3.

When data is supplied from the host 2*a* to the LBP 1500 through the host I/F 11*a*, the CPU 7 stores the input data (which is constructed by a character code and a control code) into the first input buffer 9*a*. The CPU 7 also stores the value indicative of the first I/F, for example, "1" into the current I/F storage area 9*d*.

After all of the input data was stored in the input buffer 9*a*, the CPU 7 interprets the print data stored in the input buffer 9*a* with reference to the print data analyzing program stored in the PROM 8 and converts, for instance, a character code to a character pattern, thereby forming the image data. The image data formed by the CPU 7 is stored into the frame buffer 9*c* (bit map memory).

The CPU 7 interprets all of the input data and forms the image data and stores into the frame buffer 9*c* and, after that, sends the image data (bit map data) stored in the frame buffer 9*c* to the engine 4 through the engine I/F 12.

When receiving the image data transmitted from the CPU 7 through the engine I/F 12, the engine 4 prints and outputs the image data onto an actual recording medium.

As mentioned above, in the case where the data is inputted from the host 2*a*, the LBP 1500 executes the ordinary printing process, thereby actually outputting the image data to the recording medium.

In the case where the data is supplied from the host 2*b*, the LBP 1500 executes processes similar to those mentioned above excluding that the input data (which is constructed by a character code and a control code) is stored in the second input buffer 9*b* and a value indicating the second I/F, for example, "2" is stored in the current I/F storage area 9*d*, so that the image data is actually outputted to the recording medium.

In this instance, when the operator depresses the first I/F reset button 5*a* or second I/F reset button 5*b* provided for the panel device 1501 during the ordinary printing process as mentioned above, an interruption to reset the first I/F or second I/F is notified to the CPU 7. The resetting process which is executed by the controller 1000 in this case will now be described with reference to a flowchart shown in FIG. 4.

Figure 4:
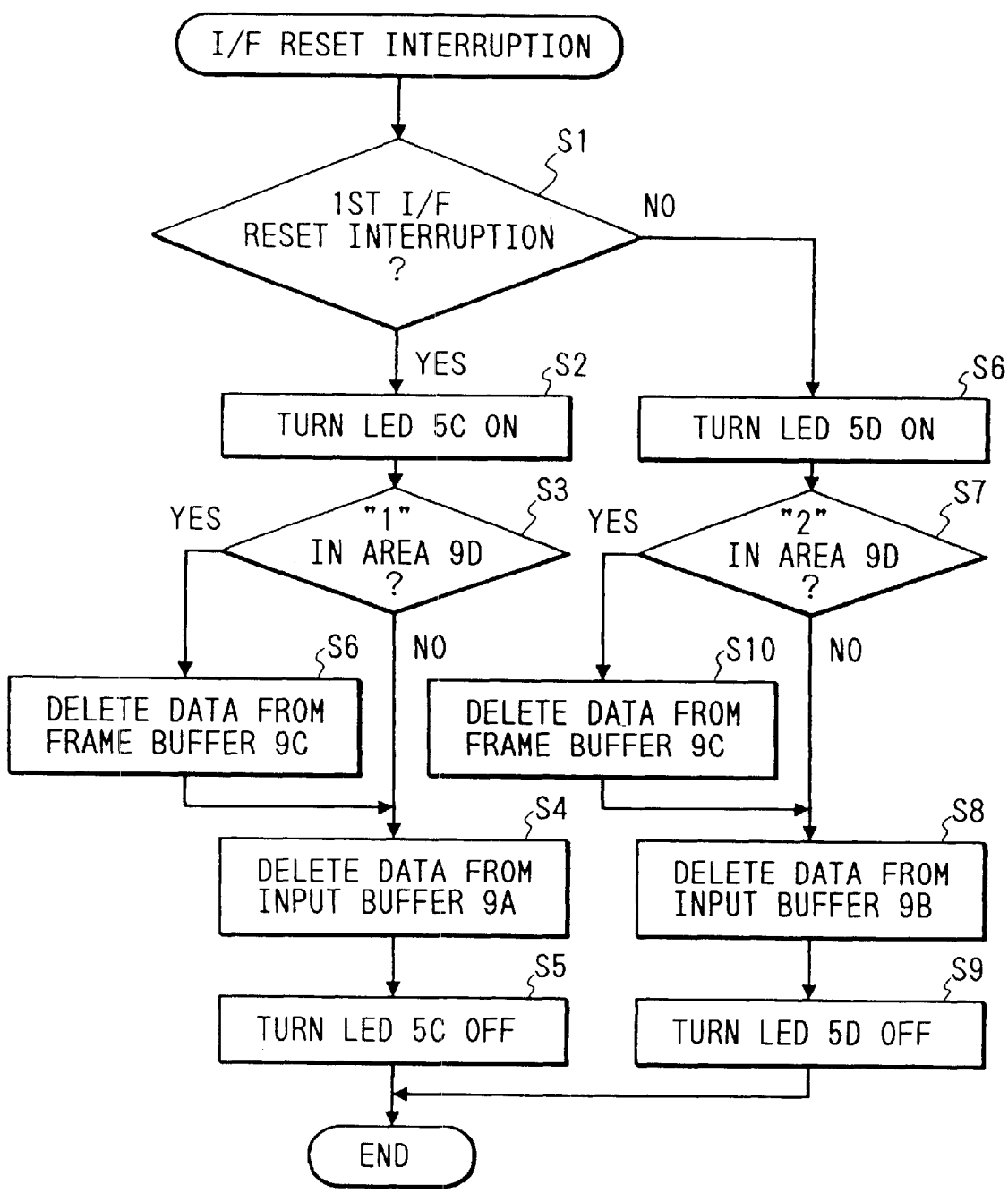
FIG. 4 is a flowchart showing an I/F reset interrupting process.

A program shown in the flowchart of FIG. 4 has been stored in the PROM 8 and is executed by the CPU 7.

When the interruption notification to reset the first or second I/F is generated from the panel device 1501, the CPU 7 judges whether it is the interruption notification to reset the first I/F or not in step S1. When the CPU judges that it is the interruption notification to reset the first I/F in step S1, the CPU 7 turns on the first LED 5*c* of the panel device 1501 through the panel I/F 13 in step S2. In step S3, a check is made to see if the value stored in the current I/F name storage area 9d is equal to "1" (the first I/F) or not. In the case where the value (1) indicative of the first I/F has been stored in the current I/F name storage area 9*d*, this means that the input data received from the host apparatus 2*a* was being printed. In the case where the value (2) indicative of the second I/F has been stored, this means that the input data received from the host apparatus 2*b* is being printed. In step S3, when the CPU judges that the value stored in the current I/F storage area 9*d* is equal to "2", namely, the input data from the second host is being printed (or, during the pattern development), the CPU 7 deletes the input data stored in the first input buffer 9*a* in step S4. This is because the controller 1000 was executing the printing process (or, the pattern developing process) to the input data received from the second host 2*b* just before the interrupting process is started and the image data (corresponding to the input data received from the second host 2*b*) stored in the frame buffer 9*c* is not deleted. In step S5, after the input data stored in the first input buffer 9*a* was deleted, the CPU 7 turns off the first LED 5*c*, thereby finishing the interrupting process. In this case, since it relates to the reset interruption in which the input data from the second host 2*b* is being printed (or, during the pattern development), after completion of the interrupting process, the printing process (or, pattern developing process) of the input data from the second host 2*b* which was interrupted by the interrupting process is restarted. On the other hand, when the CPU 7 judges that the value stored in the current I/F name storage area 9*d* is equal to "1", namely, the input data from the first host is being processed (or, during the pattern development) in step S3, the CPU 7 deletes the image data stored in the frame buffer 9*c* in step S6. This means that the controller 1000 was printing the data received from the first host 2*a* (or, during the pattern development) just before the interrupting process is started, so that the image data to be printed has been stored in the frame buffer 9*c*. The processing routine subsequently advances to step S4 and the input data stored in the first input buffer 9*a* is deleted as mentioned above. In step S5, after the input data stored in the first input buffer 9*a* was deleted, the first LED 5*c* is turned off and the interrupting process is finished.

In this case, the process interrupted by the interrupting process is the printing process of the data from the first host computer and the resetting process of the data from the first host computer is executed by such an interruption. Therefore, after completion of the interrupting process, the printing process of the data from the first host computer which was interrupted is not started again.

When the CPU judges that the interruption indicates the interrupting notification to reset the second I/F in step S1, the CPU 7 turns on the second LED 5*d* in step S6 and a check is made in step S7 to see if the value stored in the current I/F name storage area 9*d* is equal to "2" or not.

When it is judged that the value stored in the current I/F name storage area 9*d* is equal to "1", namely, the input data from the first host 2*a* is being printed (or, during the pattern development), the CPU 7 deletes the input data stored in the second input buffer 9*b* in step S8. This is because the controller 1000 is executing the printing process (or pattern development) to the input data received from the first host 2*a* just before the interrupting process is started and the image data (corresponding to the input data received from the first host 2*a*) stored in the frame buffer 9*c* is not deleted.

Subsequently, in step S9, the CPU 7 deletes the input data stored in the second input buffer 9*b* and, after that, turns off the second LED 5*d*. The interrupting process is finished. In this case, since the resetting interruption in which the input data from the first host 2*a* is being printed (or, during the pattern development) is performed, when the interrupting process is finished, the printing process (or, pattern developing process) of the input data from the first host 2*a* which was interrupted by the interrupting process is restarted.

On the other hand, in step S7, when the CPU 7 judges that the value stored in the current I/F name storage area 9*d* is equal to "2", that is, the input data from the second host 2b is being printed (or, during the pattern development) in step S7, the CPU 7 deletes the image data stored in the frame buffer 9c in step S10. This is because since the controller 1000 was executing the printing process (or pattern development) to the input data received from the second host 2b just before the interrupting process is started, the image data to be printed has been stored in the frame buffer 9c.

The processing routine advances to step S8 and the input data stored in the second input buffer 9b is deleted in a manner similar to the above. In step S9, when the deletion of the input data stored in the second input buffer 9b is finished, the second LED 5d is lit off and the interrupting process is finished. In this case, the process interrupted by the interrupting process is the printing process (or data developing process) of the input data from the second host 2b. The resetting process of the input data from the second host 2b is executed by such an interruption. Therefore, after the interrupting process, the printing process (or pattern developing process) of the input data from the second host 2b which was interrupted is not restarted.

As described above, according to the embodiment, the input data in the input buffer of an arbitrary I/F which is designated by the user can be deleted. For example, even when the input data is received from the first host 2a through the first I/F 11a and is being printed (or, during the pattern development) (when the first I/F 11a is in an active state), the input data is received through the second I/F 11b and the input data stored in the input buffer 9b can be deleted.

As described above, only the data which needs the resetting process can be reset. A situation such that the data which doesn't need to be reset is forcedly reset can be prevented. Further, since the LED which properly indicates the I/F is ON during the resetting operation, the operator can recognize the I/F which is executing the deleting process. Therefore, a situation such that the data is erroneously sent to the interface which is executing the resetting process and the data is deleted and is not printed and outputted can be prevented.

Although the embodiment has been described with respect to the case of using the LBP as a printing apparatus as an example, the invention is not limited to such an example. For instance, another printer such as LED printer, dot impact printer, or the like or another printing apparatus such as printer, copying apparatus, or the like can be also used.

Although the embodiment has been described with respect to the case where the apparatus has a plurality of input buffers as an example, it is also possible to construct in a manner such that one input buffer is used and an identifier or the like of the I/F name is added to each data to be stored.

Although the example using the panel device has been shown and described as a method of designating the I/F to be reset by the operator, it is also possible to use a method of designating the I/F to be reset by a command through the host computer.

Although the embodiment has been described with respect to the example in which the interface during the resetting process is notified to the operator by using the LED on the panel device, the name of the interface during the resetting process can be also displayed on the liquid crystal display (LCD) on the panel device. Or, such an interface name can be also notified to the host computer through a bidirectional interface and displayed on a display device such as a CRT or the like.

With such a construction, the invention is particularly effective to the case where the upper apparatus such as a host computer or the like and the printing apparatus such as a printer or the like are installed at remote positions or the like.

The invention can be applied to a system comprising a plurality of equipment or may be also applied to an apparatus comprising one equipment. The invention can be also obviously applied to the case where the invention is accomplished by supplying a program to a system or an apparatus.

In the above embodiment, the input buffer (comprising a character code and a control code) stored in the input buffer has been deleted. However, a type phase or macro data can be also deleted every I/F.

According to the above embodiment, the image data in the frame buffer of an arbitrary I/F that is designated by the user can be deleted.

What is claimed is:

1. An output apparatus comprising:

input means for inputting a plurality of first data respectively supplied from different external apparatuses;

an input buffer section for storing at least one of the plurality of first data input by said input means;

an analyzing section for analyzing one of the plurality of first data input by said input means and for forming second data based on the analyzed first data, the first data and the second data having different data types;

control means for controlling, in response to a deletion instruction, said input buffer section and said analyzing section to selectively delete the first data stored in said input buffer section and the second data formed by said analyzing section based on an identifier corresponding to the first data; and means for adding the identifier to the first data stored in said input buffer section.

2. An output apparatus comprising:

input means for inputting a plurality of first data respectively supplied from different external apparatuses;

an input buffer section for storing at least one of the plurality of first data input by said input means;

an analyzing section for analyzing one of the plurality of first data input by said input means and for forming second data based on the analyzed first data, the first data and the second data having different data types;

control means, responsive to a deletion instruction, for controlling said input buffer section to delete the first data stored in said input buffer section based on an identifier corresponding to the first data, and for controlling said analyzing section to delete the second data formed based on the first data corresponding to the identifier; and means for adding the identifier to the first data stored in said input buffer section.

3. An output method comprising:

an input step of inputting a plurality of first data respectively supplied from different external apparatuses;

a storing step of storing in an input buffer section at least one of the plurality of first data input in said input step;

an analysis step for analyzing in an analyzing section one of the plurality of first data input in said input step and for forming second data based on the analyzed first data, the first data and the second data having different data types;

a control step for controlling, in response to a deletion instruction, the input buffer section and the analyzing section to selectively delete the first data stored in the input buffer section and the second data formed in said analysis step based on an identifier corresponding to the first data; and an adding step for adding the identifier to the first data stored in the input buffer section.

4. An output method comprising:

an input step for inputting a plurality of first data respectively supplied from different external apparatuses;

a storing step of storing in an input buffer section at least one of the plurality of first data input in said input step;

an analysis step for analyzing in an analyzing section one of the plurality of first data input by in said input step and for forming second data based on the analyzed first data, the first data and the second data having different data types;

a control step, responsive to a deletion instruction, for controlling the input buffer section to delete the first data stored in the input buffer section based on an identifier corresponding to the first data, and for controlling the analyzing section to delete the second data formed based on the first data corresponding to the identifier; and an adding step for adding the identifier to the first data stored in the input buffer section.

5. A computer memory medium storing a program for implementing an output method, the method comprising:

an input step of inputting a plurality of first data respectively supplied from different external apparatuses;

a storing step of storing in an input buffer section at least one of the plurality of first data input in said input step;

an analysis step for analyzing in an analyzing section one of the plurality of first data input in said input step and for forming second data based on the analyzed first data, the first data and the second data having different data types;

a control step for controlling, in response to a deletion instruction, the input buffer section and the analyzing section to selectively delete the first data stored in the input buffer section and the second data formed in said analysis step based on an identifier corresponding to the first data; and an adding step for adding the identifier to the first data stored in the input buffer section.

6. A computer memory medium storing a program for implementing an output method, the method comprising:

an input step for inputting a plurality of first data respectively supplied from different external apparatuses;

a storing step of storing in an input buffer section at least one of the plurality of first data input in said input step;

an analysis step for analyzing in an analyzing section one of the plurality of first data input by in said input step and for forming second data based on the analyzed first data, the first data and the second data having different data types;

a control step, responsive to a deletion instruction, for controlling the input buffer section to delete the first data stored in the input buffer section based on an identifier corresponding to the first data, and for controlling the analyzing section to delete the second data formed based on the first data corresponding to the identifier; and an adding step for adding the identifier to the first data stored in the input buffer section.

* * * * *

UNITED STATES PATENT AND TRADEMARK OFFICE
CERTIFICATE OF CORRECTION

PATENT NO. : 6,567,183 B1
DATED : May 20, 2003
INVENTOR(S) : Junichi Mori et al.

It is certified that error appears in the above-identified patent and that said Letters Patent is hereby corrected as shown below:

Column 4,
Line 42, "an RAM" should read -- a RAM --.

Column 9,
Line 13, "by in" should read -- in --.

Column 10,
Line 20, "by in" should read -- in --.

Signed and Sealed this

Second Day of September, 2003

JAMES E. ROGAN
*Director of the United States Patent and Trademark Office*